(12) United States Patent
Liu et al.

(10) Patent No.: US 7,760,812 B2
(45) Date of Patent: Jul. 20, 2010

(54) HARQ METHOD AND SYSTEM

(75) Inventors: Fang Liu, Beijing (CN); Zhengang Pan, Beijing (CN); Lan Chen, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 805 days.

(21) Appl. No.: 11/639,993

(22) Filed: Dec. 14, 2006

(65) Prior Publication Data

US 2007/0153928 A1 Jul. 5, 2007

(30) Foreign Application Priority Data

Dec. 16, 2005 (CN) .......................... 2005 1 0134777

(51) Int. Cl.
*H04K 1/10* (2006.01)
*H04L 27/00* (2006.01)
*H04L 27/28* (2006.01)
*H04W 36/00* (2009.01)
*H04W 72/00* (2009.01)

(52) U.S. Cl. ...................... 375/260; 375/259; 375/261; 455/436; 455/437; 455/450

(58) Field of Classification Search ............ 340/825.56; 370/203–209, 238, 252, 255, 278, 310, 314, 370/315, 320, 328–350, 456, 479; 375/220, 375/259–261, 267, 296–299, 316; 380/268; 455/436, 437, 450; 709/200, 236; 714/749
See application file for complete search history.

(56) References Cited

U.S. PATENT DOCUMENTS

2003/0231715 A1 12/2003 Shoemaker et al.

FOREIGN PATENT DOCUMENTS

EP 1 533 966 A2 5/2005
EP 1 545 041 A3 6/2005
EP 1 646 170 A1 12/2006
WO WO 2005020488 3/2005

OTHER PUBLICATIONS

European Search Report dated Mar. 5, 2007; EP Patent Application No. 06025858.9, 8 pgs.
Atarashi, et al. "An Efficient ARQ Scheme for Multi-Carrier Modulation Systems based on Packet Combining," IEICE Transactions on Communications, Communications Society, Tokyo, JP, vol. E82-B, No. 5, May 1999, pp. 731-739, XP000940234, ISSN: 0916-8516, p. 733-735, Section 3.

*Primary Examiner*—David C Payne
*Assistant Examiner*—Erin M File
(74) *Attorney, Agent, or Firm*—Blakely, Sokoloff, Taylor & Zafman LLP

(57) ABSTRACT

Embodiments of the present invention include one HARQ method and system in which the data is transmitted/received with N transmit antennas and M receive antennas, wherein each transmit antenna transmits data by using L subcarriers, M and N are natural numbers and L is the multiple of 2. The method comprises: converting the transmission data into N data streams, then converting each data stream into L substreams, allocating NL subcarriers to the NL substreams according to the same subcarrier allocation table prestored in the transmitter and the receiver, and transmitting the NL substreams by the transmit antennas; recovering the received data to the original N data streams according to the subcarrier allocation table prestored in the receiver and checking if each data stream is received correctly and feeding back the feedback information to the transmitter; and the transmitter transmitting new data or re-transmitting data according to the feedback information.

18 Claims, 14 Drawing Sheets

|  | Stream A | Stream B |
|---|---|---|
| transmit antenna 1 | Group 2 (2) | Group 1 (3) |
| transmit antenna 2 | Group 1 (1) | Group 2 (4) |

HARQ METHOD AND SYSTEM

PRIORITY

The present application claims priority to and incorporates by reference the entire contents of Chinese priority document 200510134777.8, filed in China on Dec. 16, 2005.

FIELD OF THE INVENTION

The present invention relates to a communication method and system, specifically a communication method and system adopting the space-time-frequency diversity HARQ scheme in a multicarrier and multiantenna system.

BACKGROUND OF THE INVENTION

The new generation of mobile communications can enhance the data transmission rate up to 100 Mbit/s or even higher and can support services ranging from voice to multimedia services, which include real-time stream-media service. The data transmission rate can be adjusted dynamically according to the requirements of different services in the new generation of communications. In addition, the other characteristic of the new generation of communications is low cost. Thus, high efficiency frequency band technology is needed to realize high data rate and large capacity within limited frequency resources.

MIMO (multiple input multiple output) technology to develop space resources sufficiently can realize multitransmitting and multireceiving with a plurality of antennas, so that it can increase the channel capacity by multiples without increasing frequency spectrum resources and antenna transmission power. In Orthogonal Frequency Division Multiplexing (OFDM) technology as a kind of multicarrier transmission technology, the carriers are orthogonal with each other and thus the frequency resources can be used efficiently; in addition, OFDM divides the total bandwidth into several narrowband subcarriers, which can counteract frequency selective fading effectively. Therefore, the trend is to combine the two technologies adequately to realize data communications of the next generation mobile communication.

Currently, there are three basic kinds of error control techniques for reliable transmission of data communications, which are Forward Error Correction (FEC), Automatic Repeat reQuest (ARQ) and Hybrid ARQ (HARQ) which is the combination of the FEC and ARQ. HARQ has the best reliability and throughput performance.

HARQ can be classified into three kinds, i.e., HARQ-I, HARQ-II and HARQ-III. HARQ-II and HARQ-III make use of coding and diversity combining respectively and obtain certain coding and diversity gain accordingly.

It should be understood that the traditional HARQ-III combines the different copies received at different time to obtain the time diversity gain. However, the time diversity gain depends on the correlation between the data retransmission intervals and the channel coherence time. When the data retransmission interval is larger than the channel coherence time, the time diversity gain will be significant, otherwise feeble. In order to obtain significant time diversity gain in slow fading channels, therefore, the data retransmission interval must be larger than the channel coherence time, which results in the increase in round-trip delay and badness for real-time services; while in fast fading channels, time diversity gain is more significant.

Hiroyuki Atarashi, et al., "Partial Frequency ARQ System for Multi-Carrier Packet Communication", IEICE TRANS. COMMUN., VOL. E78-B, No. 8 Aug. 1995 and Liyu Cai, et al., "Improved HARQ scheme using channel quality feedback for OFDM system," Vehicular Technology Conference, 2004. VTC 2004-Spring. 2004 IEEE 59th Volume 4, 17-19 May 2004 Page(s): 1869-1872 Vol. 4 both disclose a kind of partial retransmission diversity ARQ scheme for OFDM system, wherein a threshold level is set at the receiver side and compared with the level of the signal received on each subcarrier. If the received data is determined error, the data on the unreliable subcarriers whose receiving level is lower than the threshold level will be retransmitted. During retransmission, some better subcarriers can be chosen to retransmit data on those unreliable subcarriers and also all subcarriers can be chosen to re-transmit data on those unreliable subcarriers. Then, the re-transmitted data and the previous received data will be combined at the receiver in order to obtain the time and frequency gain. If only partial subcarriers are used for retransmission, the rest subcarriers can be used to transmit new data.

Hiroyuki Atarashi et al., "An efficient ARQ Scheme for Multi-Carrier Modulation Systems Based on Packet Combining," IEICE TRANS. COMMUN., VOL. E82-B, NO. 5 MAY 1999 and T. Kumagai, et al., "A maximal Ratio Combining Frequency Diversity ARQ Scheme for High-Speed OFDM Systems," Personal, Indoor and Mobile Radio Communications, 1998, The Ninth IEEE International Symposium on Volume 2, 8-11 Sep. 1998 Page(s): 528-532 vol. 2 both disclose a frequency diversity ARQ scheme in which the subcarrier allocation mode is changed in retransmission according to the characteristic, the channels on subcarriers whose interval is larger than the coherence bandwidth are independent each other. The retransmission data are allocated to the aforementioned subcarriers in different modes in order to counteract the time correlation on channels in the slow fading environment. And the multiple received copies at the receiver will be combined by maximal ratio combining to obtain the time and frequency diversity gain. The disadvantage of the ARQ scheme is that the subcarriers allocation mode used for retransmission depends on the coherence bandwidth so the allocation manners are limited. In addition, the fading of each subcarrier is similar in the fast fading environment in view of statistics, so the frequency diversity is not as obvious as that in the slow fading environment.

E. N. Onggosanusi, et al., "HARQ Transmission and Combining for MIMO Systems," Communications, 2003. ICC '03 IEEE International Conference on Volume 5, 11-15 May 2003 Page(s): 3205-3209 vol. discloses a HARQ scheme focusing on MIMO system, which combines the different trellis-coded modulations for retransmission with the antenna permutation, obtains mapping diversity using different trellis-coded modulations and obtains the space gain using the antenna permutation. The scheme is similar with OFDM system, which counteracts the time correlation on slow fading channels by antenna permutation. However, the disadvantage is that the space diversity gain by the antenna permutation is not very significant in the fast fading environment. And if the scheme is used in MIMO-OFDM system, the space-frequency-time diversity gain cannot be developed simultaneously.

Table 1 further shows and compares the characteristics of the four HARQ schemes from the point of subcarrier allocation mode and antenna permutation. Scheme I is a simple combination of chase combining and MIMO-OFDM system. Scheme II and Scheme III implement this two ARQ schemes in single antenna system to each data stream of the MIMO-OFDM system, i.e., data streams of every antenna can adopt different subcarrier modes while the antenna remains unchanged. Compared with Scheme II and Scheme III, the subcarrier allocation modes are fixed for each antenna while the antenna permutation is variable in Scheme IV.

TABLE 1

Characteristics of Four HARQ Schemes

| Scheme | Name | Subcarrier Allocation Mode | Antenna Permutation | Problems |
| --- | --- | --- | --- | --- |
| Scheme I | Each antenna adopts chase combing HARQ | Fixed | Fixed | No space and frequency diversity gain |
| Scheme II | Each antenna adopts partial frequency ARQ | Variable | Fixed | Limited diversity gain on frequency, no space diversity gain, dependant on SNR threshold value, large feedback information |
| Scheme III | Each antenna adopts MRC frequency diversity ARQ | 4 kinds variable modes | Fixed | Limited diversity gain on frequency, no space diversity gain |
| Scheme IV | Antenna permutaion HARQ | Fixed | Variable | Limited diversity gain on space, no frequency diversity gain |

Aiming at MIMO-OFDM system, it is necessary to design a new kind of HARQ scheme, which can develop frequency-space-time resources adequately.

SUMMARY OF THE INVENTION

A HARQ method and system are described. In one embodiment, a HARQ method in which the different transmission data are transmitted/received with N transmit antennas of the transmitter and M receive antennas of the receiver, wherein each transmit antenna transmits data by using L subcarriers, the M and N are natural numbers and L is a multiple of 2, the method including: a) converting the transmission data into N data streams, then converting each data stream into L substreams, allocating NL subcarriers to the NL substreams according to the same subcarrier allocation table prestored in the transmitter and the receiver, and transmitting the NL substreams by the transmit antennas; b) recovering the received data to the original N data streams according to the subcarrier allocation table prestored in the receiver, checking if each data stream is received correctly and sending the feedback information to the transmitter, wherein the feedback information comprises ACK corresponding to the correctly received data streams, or Negative ACK (NACK) corresponding to the incorrectly received data streams and the updated subcarrier allocation table, wherein, based on the equivalent channel gain of the NL subcarriers and the error characteristics of the N data streams, the updated subcarrier allocation table is obtained according to the principle of the subcarrier allocation in which the best subcarriers with the highest equivalent channel gain are allocated to the data stream with the largest error size and the least subcarriers are allocated to the data stream with the smallest error size or by the principle of the subcarrier group allocation in which the best groups with the highest average equivalent channel gain are allocated to the data stream with the largest error size and the least groups are allocated to data stream with smallest error size; and c) the transmitter transmits new data or retransmits data according to the feedback information.

DETAILED DESCRIPTION OF THE INVENTION

Figure 1:
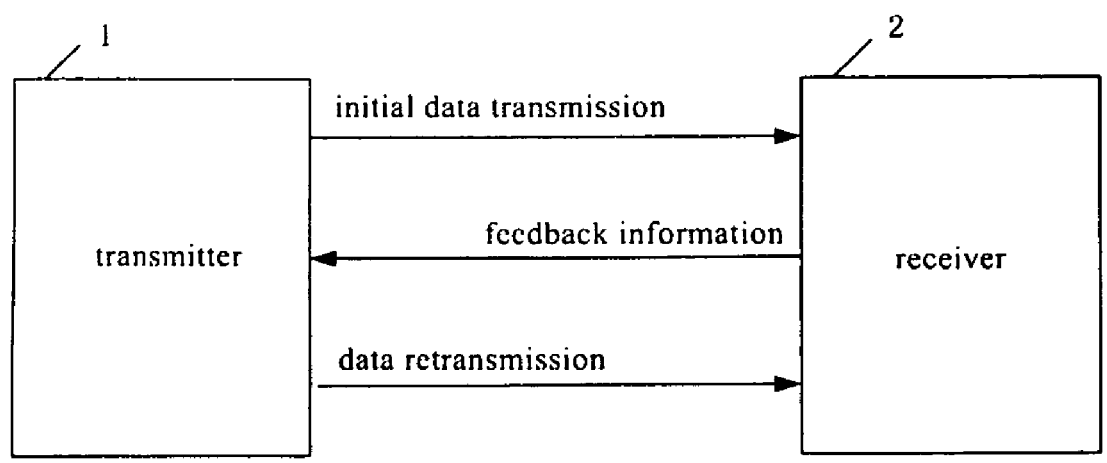
FIG. 1 is a block diagram showing the architecture of the MIMO-OFDM system according to the present invention.

Embodiments of the present invention comprises communication using a HARQ scheme. In one embodiment, the HARQ scheme can develop frequency-space-time resources adequately and provide a more reliable and effective transmission quality. In another embodiment, HARQ scheme can develop frequency-space-time resources adequately and provide a more reliable and effective transmission quality.

According to the first embodiment of the present invention, HARQ method is provided in which the data is transmitted/received with N transmit antennas of the transmitter and M receive antennas of the receiver, wherein, each transmit antenna transmits data by using L subcarriers, the M and N are natural numbers and L is a multiple of 2, the method including: a) converting the transmission data into N data streams, then converting each data stream into L substreams, allocating NL subcarriers to the NL substreams according to the same subcarrier allocation table prestored in the transmitter and the receiver, and transmitting the NL substreams by the transmit antennas; b) recovering the received data to the original N data streams according to the subcarrier allocation table prestored in the receiver and checking if each data stream is received correctly and sending the feedback information to the transmitter, wherein the feedback information includes ACK corresponding to the correctly received data streams, or Negative ACK (NACK) corresponding to the incorrectly received data streams and the updated subcarrier allocation table, wherein, based on the equivalent channel gain of the NL subcarriers and the error characteristics of the N data streams, the updated subcarrier allocation table is obtained according to the principle of subcarrier allocation in which the best subcarriers with the high equivalent channel gain are allocated to the data stream with the largest error size and the least subcarriers are allocated to the data stream with the smallest error size or by the principle of the subcarrier group allocation in which the best groups with the highest average equivalent channel gain are allocated to the data stream with the largest error size and the least group are allocated to data stream with smallest error size; and c) the transmitter transmits new data or retransmits data according to the feedback information.

According to the second embodiment of the present invention, a HARQ method is provided in which the data is transmitted/received with N transmit antennas and M receive antennas, wherein each transmit antenna transmits data by using L subcarriers, where the M and N are natural numbers and L is a multiple of 2, wherein the transmitter converts the transmission data into N data streams, then converts each data stream into L substreams, allocates NL subcarriers to the NL substreams according to the same subcarrier allocation table prestored in the transmitter and the receiver and transmits the streams by the transmit antennas, and the transmitter transmits new data or retransmits the data according to the feedback information sent by the receiver; and the receiver recovers the received data to the N data streams according to the prestored subcarrier allocation table, checks if each data stream is received correctly and feeds back the feedback information to the transmitter, wherein the feedback information includes ACK corresponding to the correctly received data streams, or Negative ACK (NACK) corresponding to the incorrectly received data streams and the updated subcarrier allocation table, wherein, based on the equivalent channel gain of the NL subcarriers and the error characteristics of the N data streams, the updated subcarrier allocation table is obtained according to the principle of subcarrier allocation in which the best subcarriers with the highest equivalent channel gain are allocated to the data stream with the largest error size and the least subcarriers are allocated to the data stream with the smallest error size or by the principle of the subcarrier group allocation in which the best groups with the highest average equivalent channel gain are allocated to the data stream with the largest error size and the least group are allocated to data stream with smallest error size.

Advantages of embodiments of the present invention include achieving the lowest block error rate, the highest throughput and the shortest average transmission time by using space-time-frequency resource adequately. Because embodiments of the present application allocate different subcarriers to different data streams, and in retransmission the present application allocates the best subcarriers with the highest equivalent channel gain to the data stream with the largest error size and the least subcarriers to the data stream with the smallest error size or allocates the best groups with the highest average equivalent channel gain to the data stream with the largest error size and the least group to data stream with smallest error size. Therefore, a more reliable and effective transmission quality can be provided for wireless high-speed data communications.

An embodiment of the present invention includes a MIMO-OFDM system adopting the space-time-frequency diversity HARQ in order to develop frequency-space-time resources adequately. FIG. 1 is a block diagram showing the architecture of the MIMO-OFDM system according to the present invention.

As shown in FIG. 1, the MIMO-OFDM system adopting the space-time-frequency diversity HARQ of the present invention includes transmitter 1 and receiver 2.

The communication process between the transmitter 1 and the receiver 2 is as follows: after the transmitter 1 initially transmits data A according to the prestored subcarrier allocation table, the receiver 2 feeds back the feedback information to the transmitter 1 based on the space-time-frequency diversity HARQ method provided by the present invention and then the transmitter 1 operates based on the feedback information. The feedback information from the receiver 2 includes ACK/NACK (Affirmative/Negative Feedback information) and the updated subcarrier allocation table wherein ACK mechanism receiving correctly and NACK mechanism receiving incorrectly, so that the transmitter 1 will retransmit data streams corresponding to NACK based on the updated subcarrier allocation table. When part of data A needs to be retransmitted, the transmitter 1 can only retransmit the incorrectly received part of data A and use other subcarriers to transmit new data A'; or the transmitter 1 can retransmit all the data streams of data A.

The main idea of the space-time-frequency diversity HARQ method of the present invention is that: the receiver calculates the equivalent channel gain per subcarrier and ranks the subcarriers in descending order. At the same time, the error characteristics of different data streams at the receiver will be determined, the subcarriers with the highest equivalent channel gains will be allocated to the data stream with the largest error size, the subcarriers with the lowest equivalent channel gains will be allocated to the data stream with the smallest error size and thus the defined subcarrier allocation table will be fed back to the transmitter 1.

The HARQ method of the present invention considers frequency, space and time resources and can obtain better BLER, throughput efficiency and average transmission times delay performance.

Now, the MIMO-OFDM system adopting the space-time-frequency diversity HARQ of the present invention will be described in detail with reference to the attached figures.

<Transmitter>

Figure 2:
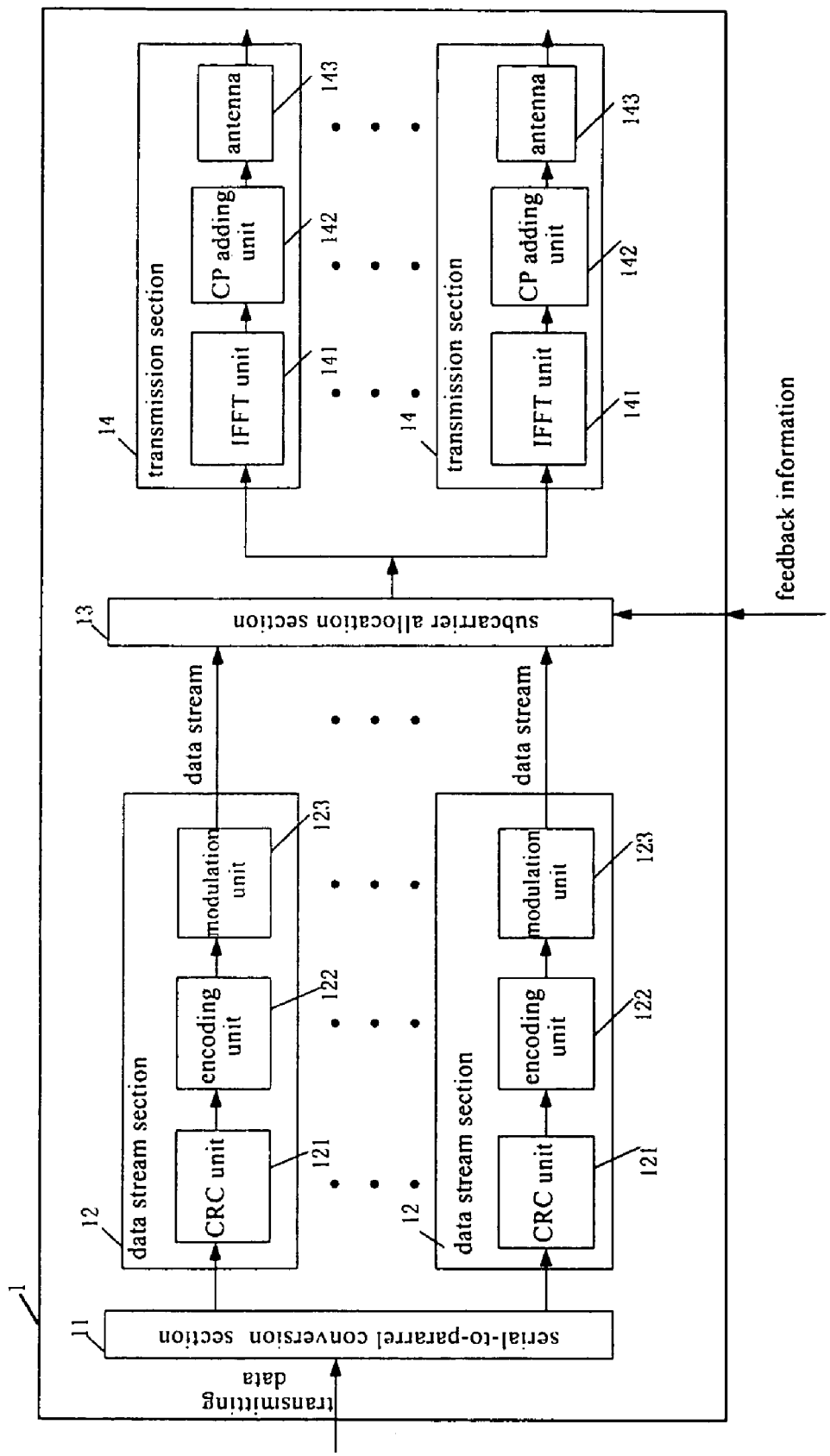
FIG. 2 is a block diagram showing the architecture of the transmitter 1 according to the present invention.

FIG. 2 is a block diagram showing the architecture of transmitter 1 according to the present invention.

As shown in FIG. 2, the transmitter 1 includes a serial-to-parallel conversion section 11, N parallel data stream sections 12, a subcarrier allocation section 13 and N parallel transmission sections 14.

Every data stream section 12 includes a CRC (cyclic redundancy check) unit 121, a encoding unit 122 and a modulation unit 123.

Every transmission section 14 includes an IFFT (inverse fast Fourier transform) unit 141, a CP (cyclic prefix) adding unit 142 and an antenna 143.

Figure 3:
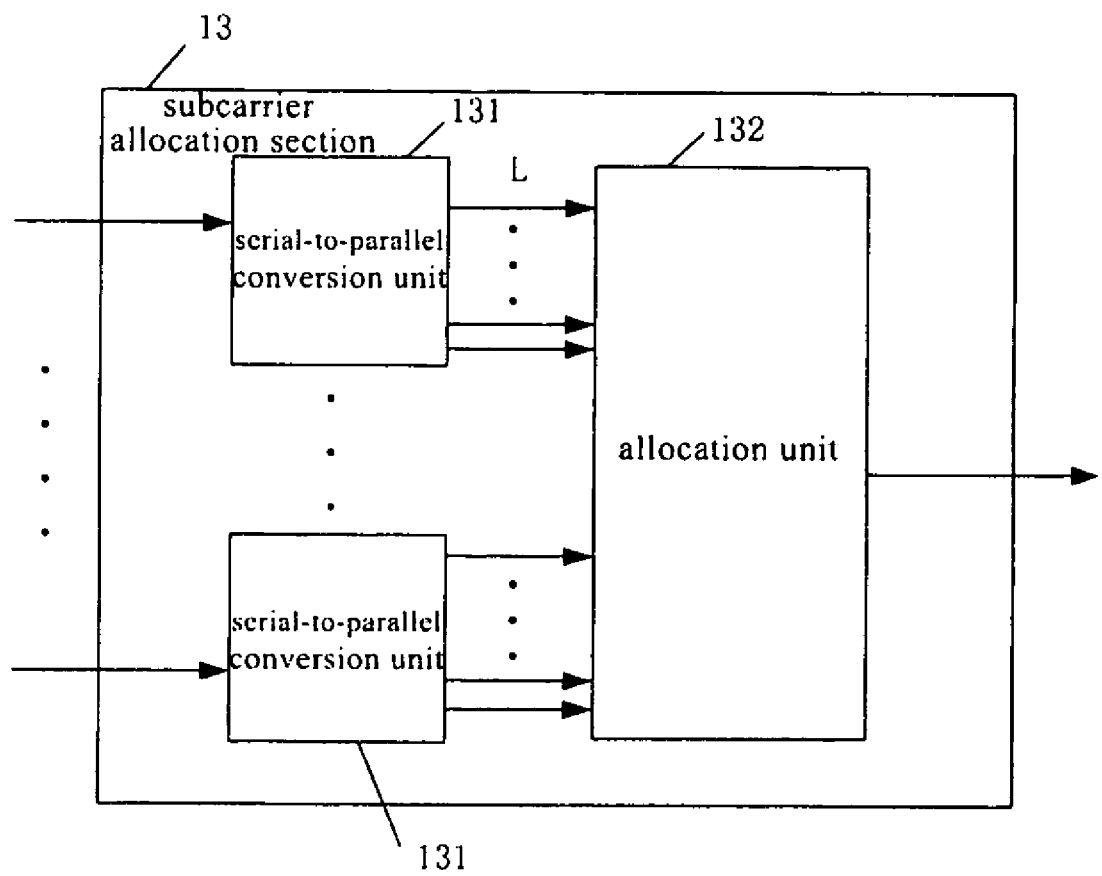
FIG. 3 is a block diagram showing the detailed architecture of the subcarrier allocation section 13 according to the present invention.

FIG. 3 is a block diagram showing the detailed architecture of the subcarrier allocation section 13 according to the present invention.

As shown in FIG. 3, the subcarrier allocation section 13 includes N serial-to-parallel conversion units 131 and an allocation unit 132. It is to be noted that the functions of the N serial-to-parallel conversion units 131 and the allocation unit 132 can be realized in one module.

Now, the initial data transmission procedure and data retransmission procedure will be described in detail with reference to FIG. 2 and FIG. 3.

<Initial Data Transmission>

When the transmitter 1 initially transmits data, the serial-to-parallel conversion section 11 converts the input data to be transmitted into N parallel data streams. Here, the $n^{th}$ ($n \in [1, N]$) data stream will be explained as an example since the process procedure of the N data streams are parallel and identical.

When the $n^{th}$ data stream section 12 receives the $n^{th}$ data stream from serial-to-parallel conversion section 11, the CRC (cyclic redundancy check) unit 121 in the $n^{th}$ data stream section 12 acquires the CRC result according to the $n^{th}$ data stream; the encoding unit 122 encodes data stream with the CRC outputted from the CRC unit 121 and acquires the encoding result; the modulation unit 123 modulates the encoding result outputted from the encoding unit 122, acquires the $n^{th}$ data stream and outputs to the subcarrier allocation section 13. It should be noted that the N data stream sections 12 acquire N data streams together.

The $n^{th}$ serial-to-parallel conversion unit 131 in the subcarrier allocation section 13 further converts the $n^{th}$ data stream outputted from the $n^{th}$ data stream section 12 into L substreams (L is the number of subcarriers). The L substreams have the same CRC so the N serial-to-parallel conversion units 131 form NL substreams in total.

The allocation unit 132 in the subcarrier allocation section 13 inputs the NL substreams from the N serial-to-parallel conversion units 131 to the N IFFT units 141 in the N transmission sections 14 according to the prestored subcarrier allocation table correspondingly. In the present embodiment, the prestored subcarrier allocation table represents that the L substreams converted from the $n^{th}$ data stream will be transmitted by the transmit antenna 143 in the $n^{th}$ transmission section 14, i.e., the L substreams from the $n^{th}$ serial-to-parallel conversion unit 131 are all input into the IFFT unit 141 in the corresponding $n^{th}$ transmission section 14.

In the present embodiment, the L substreams converted by the subcarrier allocation section 13 from the $n^{th}$ data stream output from the $n^{th}$ data stream section 12 are all transmitted by the same transmit antenna 143 on L subcarriers.

The IFFT unit 141 in the nth transmission section 14 performs inverse fast Fourier transform for the input L substreams and converts data stream signals in frequency domain into time-domain signals.

The $n^{th}$ CP adding unit 142 in the $n^{th}$ transmission section 14 adds the cyclic prefix to the time-domain signals from the IFFT unit 141, which are then transmitted by the transmit antenna 143, and thus the initial data transmission procedure is finished.

<Data Retransmission>

After transmitter 1 transmits data A, receiver 2 sends the feedback information, which includes ACK/NACK for each data stream and the updated subcarrier allocation table. Then transmitter 1 retransmits the data stream corresponding to NACK and transmits new data A' with idle subcarriers according to the feedback information. (The contents of the updated subcarrier allocation table will be explained later)

Specifically, since receiver 2 performs CRC for the N data streams but not the NL substreams, ACK/NACK in the feedback information received by transmitter 1 is corresponding to every data stream. If the feedback information for a data stream is NACK, transmitter 1 is requested to retransmit the data stream. Then the serial-to-parallel conversion section 11 and the data stream section 12 in transmitter 1 converts data A to be transmitted into N data streams again and retransmit the data stream corresponding to the NACK but not the data streams corresponding to ACK. The procedure of retransmitting the data stream corresponding to the NACK is similar to the above initial data transmission procedure and the detailed is omitted here. Since only part of the subcarriers are used for transmitting the data stream corresponding to the NACK, idle subcarriers can be used to transmit new data A' at the same time.

However, during the procedure of data retransmission, the allocation unit 132 in the subcarrier allocation section 13 allocates subcarriers to N data streams according to the updated subcarrier allocation table and every data stream is allocated L subcarriers. The contents in the updated subcarrier allocation table may indicate that L substreams converted by the $n^{th}$ data stream are allocated the subcarriers of different antennas and not transmitted by the L subcarriers of one antenna.

More specifically, L substreams converted from the $n^{th}$ data stream are transmitted by the L subcarriers of the $n^{th}$ transmit antenna during the initial data transmission procedure, while in the data retransmission procedure, L subcarriers of different antennas are allocated to the $n^{th}$ data stream for retransmission according to the updated subcarrier allocation table.

It is to be noted that the subcarrier allocation section 13 in the present embodiment can include a memory (not shown), which is used to store the N data streams inputted into the subcarrier allocation section 13 for retransmission. Therefore, when the transmitter 1 receives NACK corresponding to the data stream in the feedback information from the receiver 2, the subcarrier allocation section 13 in the transmitter 1 directly uses the N data streams stored in the memory and reallocates subcarriers for the data stream corresponding to NACK. When the transmitter 1 receives ACK from the receiver 2, the memory releases the content stored. The operations of the data stream section 12 do not need to repeat accordingly.

<Receiver>

Figure 4:
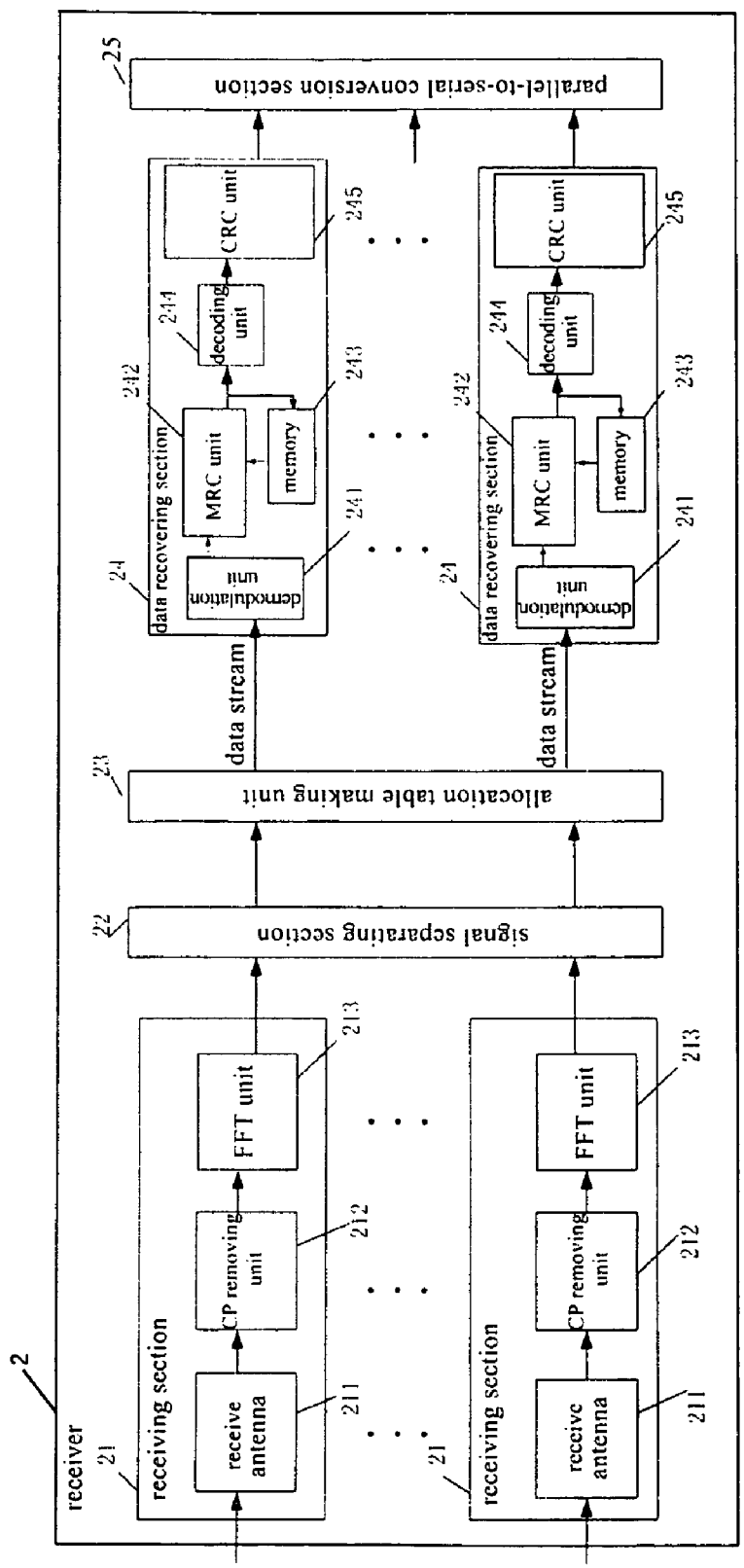
FIG. 4 is a block diagram showing the architecture of the receiver 2 according to the present invention.

FIG. 4 is a block diagram showing the architecture of the receiver 2 according to one embodiment of the present invention.

As shown in FIG. 4, the receiver 2 in the present invention includes M parallel receiving sections 21, a signal separation section 22, an allocation table making section 23, N parallel data recovering sections 24 and a parallel-to-serial conversion section 25.

Every receiving section 21 includes a receive antenna 211, a CP removing unit 212 and a FFT unit 213.

Every data recovering section 24 includes a demodulation unit 241, a MRC (maximal ratio combining) unit 242, a memory 243, a decoding unit 244 and a CRC (cyclic redundancy check) unit 245.

Figure 5:
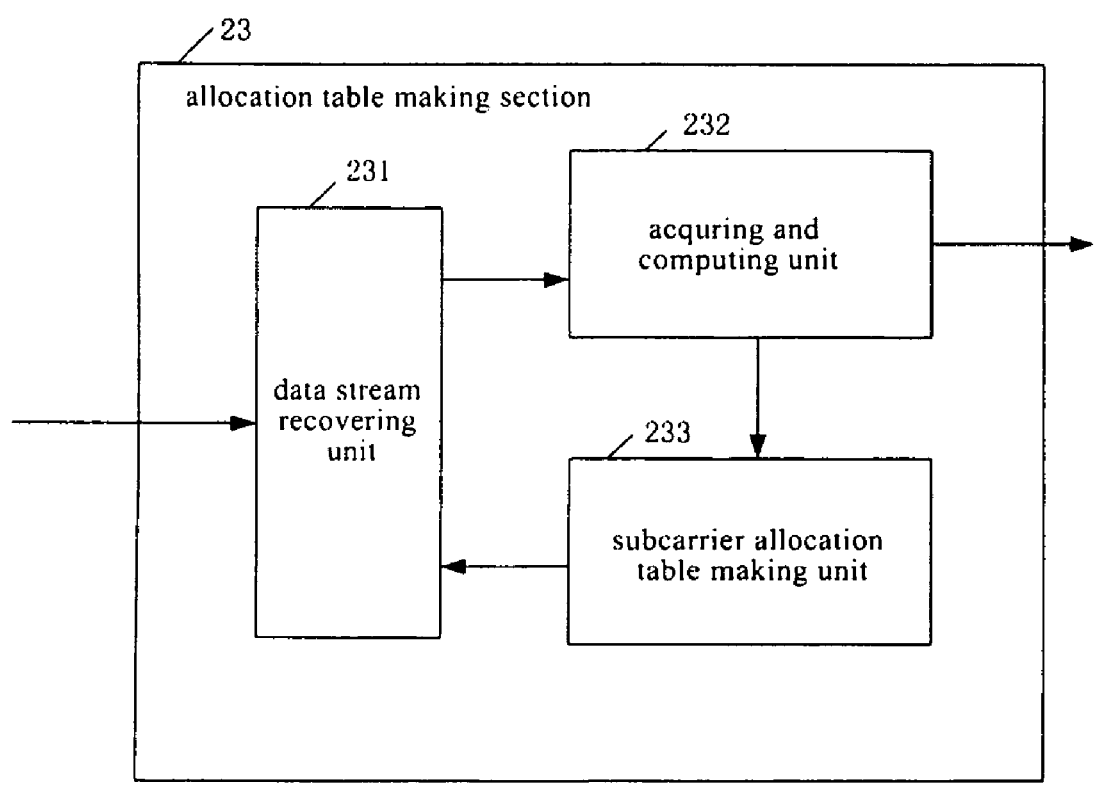
FIG. 5 is a block diagram showing the detailed architecture of the allocation table making section 23 in the receiver 2 according to the present invention.

FIG. 5 is a block diagram showing the detailed architecture of the allocation table making section 23 in the receiver 2 according to the present invention.

As shown in FIG. 5, the allocation table making section 23 of the present invention includes a data stream recovering unit 231, an acquiring and computing unit 232 and a subcarrier allocation table making unit 233. It should be understood that the functions of the data stream recovering unit 231, acquiring and computing unit 232 and subcarrier allocation table making unit 233 can be integrated in one module.

Then the procedure of data receiving of the receiver 2 will be described in detail with reference to FIG. 4 and FIG. 5.

In every parallel receiving section 21, the receive antenna 211 receives signals, the CP remove unit 212 removes the cyclic prefix of the signals received and the FFT unit 213 converts the time-domain signals from the CP remove unit 212 into frequency-domain signals.

The signal separation section 22 separates the M frequency-domain signals came from the M parallel receiving sections 21 and obtains NL separated substreams according to different transmit antennas (N) and different subcarrier frequencies (L).

Suppose that the signal $r_{m,l}$ on the $l_{th}$ ($l\in[1, L]$) subcarrier received by the $m_{th}$ ($m\in[1, M]$) receive antenna at the receiver 2 is:

$$r_{m,l} = \sum_{n=1}^{N} H_{m,n,l} \cdot C_{n,l} + \eta_{m,l}, l = 1, \ldots, L$$

Wherein, $H_{m,n,l}$ is the channel matrix (the channel matrix can be obtained at the receiver 2 by prior art) between the $n^{th}$ transmit antenna and the $m^{th}$ receive antenna on the $l^{th}$ subcarrier frequency, $C_{n,l}$ is the symbol transmitted by the $n^{th}$ transmit antenna on the $l^{th}$ subcarrier frequency and $\eta_{m,l}$ is the Gauss white noise received from the $m^{th}$ receive antenna on the $l^{th}$ subcarrier frequency.

The N symbols on the $l^{th}$ subcarrier frequency received by the receiver 2 can be decoded through the Vertical Bell-Labs Layered Space Time (V-BLAST) algorithm. Since there are L subcarriers in total, after repeating decoding L times, NL modulated symbols from transmitter 1 can be obtained and be separated at the signal separation section 22 (this process can be realized by current technologies and will not be illustrated in detail here).

After the allocation table making section 23 receives the NL modulated symbols from the signal separation section 22, the data stream recovering unit 231 will recover N data streams from the NL modulated substreams and output them to the acquiring and computing unit 232 according to the subcarrier allocation table provided by the subcarrier allocation making unit 233, wherein, the N data streams are the same with the that outputted from the N data stream sections 12 in transmitter 1.

It is to be noted that when transmitter 1 initially transmits data, the subcarrier allocation table provided by the subcarrier allocation making unit 233 is the same as the one prestored by transmitter 1 and the receiver 2, while when transmitter 1 retransmits the data, the subcarrier allocation table provided by the subcarrier allocation making unit 233 is the one updated and fed back to transmitter 1 as the receiver 2 receives the initial data, that is, after the receiver 2 feeds back the feedback information to the transmitter 1, the subcarrier allocation tables in transmitter 1 and the receiver 2 are the same, which is the updated subcarrier allocation table.

The acquiring and computing unit 232 outputs the N data streams from the data stream recovering unit 231 to the N parallel data recovering sections 24 respectively and receives the decoding results of the data streams fed back from the N parallel data recovering sections 24; the acquiring and computing unit 232 acquires the error characteristics (methods for acquiring error characteristics of the data stream can be obtained by prior art) of each decoded data stream according to the feedback and NL equivalent channel gain values of all the subcarriers from the N transmit antennas according to the above channel matrix H, and then outputs the error characteristics and the NL equivalent channel gain values of the N data streams to the subcarrier allocation making unit 233.

The subcarrier allocation making unit 233 arranges the NL equivalent channel gain values and errors of the N data streams and allocates the subcarriers according to the principle of allocating the L subcarriers with the highest equivalent channel gains to the data stream with the largest error size and allocating the L subcarriers with the lowest equivalent channel gains to the data stream with the smallest error size in order to release the prestored subcarrier allocation table and obtain the updated subcarrier allocation table.

<Data Recovering Section 24>

The process of the N data streams from the data stream recovering unit 231 in the N parallel data recovering section 24 will be explained in detail in the following.

The data recovering section 24 performs demodulation, maximal ratio combining, decoding, CRC for the input data streams to obtain the decoding results and CRC results of the data streams, feeds back the decoding results to the acquiring and computing unit 232 in the allocation table making section 23 and transfers the decoding results of the data streams received correctly to the parallel-to-serial conversion section 25.

Taking the $n^{th}$ data recovering section 24 as an example, the demodulation unit 241 in the $n^{th}$ data recovering section 24 demodulates the $n^{th}$ data stream received and obtains its demodulation result.

The MRC unit 242 judges the demodulation result of the $n^{th}$ data stream from the demodulation section 241 (the determination is based on the preamble of the data stream), wherein, if it is a data stream transmitted initially, it will be outputted to the memory 243 directly and then outputted to the decoding unit 244 as the combined result without receiving any process, while if it is the retransmitted data stream, it will be outputted to the memory 243 and at the same time, a plurality of replicas (a plurality of data streams stored in the memory 243) of the data stream received at different time in this memory will be combined and outputted to the decoding unit 244 as a combined result.

The decoding unit 244 decodes the combined result outputted from the MRC unit 242, obtains the decoding result of the data stream and outputs the result to the CRC unit 245.

The CRC unit 245 performs the cyclic redundancy check for the decoding result of the $n^{th}$ data stream outputted from the decoding unit 244, obtains the CRC result of the $n^{th}$ data stream and outputs the result to the parallel-to-serial conversion section 25. The CRC result corresponds to ACK/NACK.

The receiver 2 feeds back the updated subcarrier allocation table obtained by the subcarrier allocation table making unit 233 and ACK/NACK information corresponding to the CRC result of the data stream from the CRC unit 245 to transmitter 1 as the feedback information. The feedback information includes the updated subcarrier allocation table and ACK/NACK information corresponding to each data stream. It is to be noted that the subcarrier allocation table making unit 233 can also feed back the updated subcarrier allocation table to transmitter 1 directly.

The parallel-to-serial conversion section 25 converts the N decoding results parallelly outputted from the N parallel data recovering sections 24 and thus obtains the data transmitted by the transmitter 1.

It should be understood that the amount of the feedback information fed back by the receiver 2 is N*L*log 2(N), which is proportional to the product of the number of the subcarriers and that of the transmit antennas.

Therefore, since an embodiment of the present invention uses the updated subcarrier allocation table during retransmission, that is, allocating the subcarrier with the maximum equivalent channel gain to the data stream with the maximum error, allocating the subcarrier with the minimum equivalent channel gain to the data stream with the minimum error and transmitting data streams on different subcarriers of different antennas, the frequency-space-time resources are developed adequately, BLER, throughput and average transmission times performance can be obtained and a more reliable and effective transmission quality can be realized.

Figures 6A, 6B, 6C:
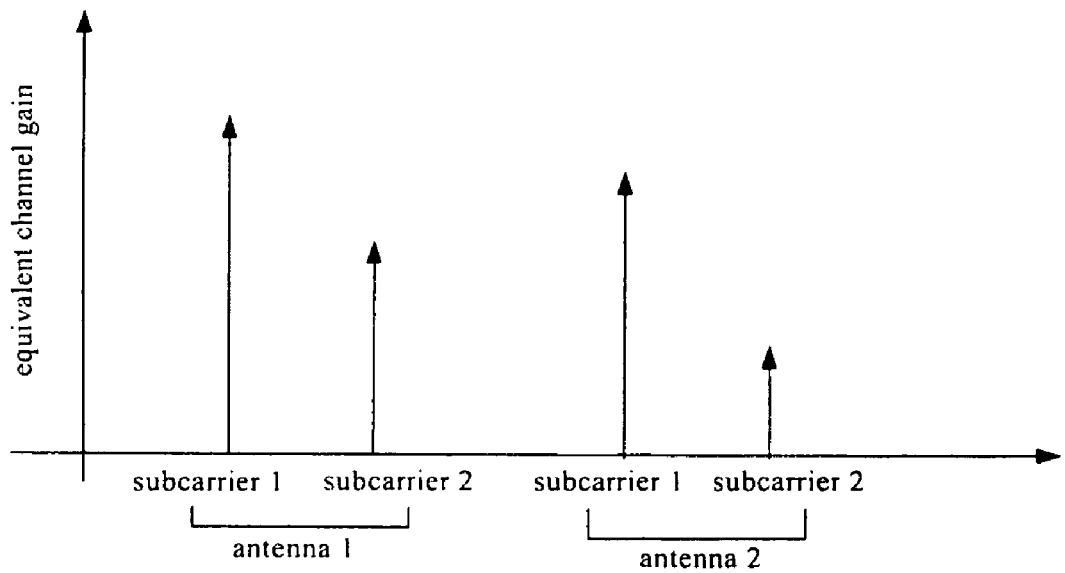
FIG. 6(a) is an example of the subcarrier allocation table prestored in transmitter 1 and receiver 2 according to the first embodiment.
FIG. 6(b) is a function diagram showing the equivalent channel gain referred by the subcarrier allocation table making unit when making a subcarrier allocation table.
FIG. 6(c) is an example of the subcarrier allocation table updated by the subcarrier allocation table making unit in the receiver 2 and fed back to the transmitter 1.

FIG. 6(a) is an example of the subcarrier allocation table prestored in the transmitter 2 and the receiver 2 according to the first embodiment. FIG. 6(b) is a function diagram showing the equivalent channel gain referred by the subcarrier allocation table making unit when making a subcarrier allocation table. FIG. 6(c) is an example of the subcarrier allocation table updated by the subcarrier allocation table making unit in the receiver 2 and fed the transmitter 1.

As shown in FIG. 6(a), suppose that the number of the transmit antenna is 2 and every antenna can use 2 subcarriers to send data (including data stream A and B), that is, the transmit antenna 1 uses 2 subcarriers to transmit data stream A and the transmit antenna 2 uses 2 subcarriers to transmit data stream B.

When the receiver 2 judges that data stream A from the transmit antenna 1 is not received correctly and data stream B from the transmit antenna 2 is received correctly, the subcarrier allocation table making unit in the receiver 2 makes the subcarrier allocation table according to the function diagram shown in FIG. 6(b).

The vertical coordinate of the function diagram represents the equivalent channel gain of the subcarrier and the horizontal coordinate represents the four subcarriers of the transmit antennas. The function diagram indicates the relations between the equivalent channel gains of the subcarrier acquired by the acquiring and computing unit 232 and the subcarriers. At this time, the error relation of the 2 data streams acquired by the acquiring and computing unit 232 is A>B.

The subcarrier allocation table making unit 233 can make the updated subcarrier allocation table as shown in FIG. 6(c) by the principle of allocating the 2 subcarriers with the maximum equivalent channel gains to the data stream A with the maximum error and allocating the 2 subcarriers with the minimum equivalent channel gains to the new data stream C according to FIG. 6(b).

It should be understood that at this time transmitter 1 can re-transmit both the data stream A and B but not new data C.

The Second Embodiment

The architectures of the transmitter 1 and the receiver 2 in the second embodiment according to the present invention are the same with those shown in FIGS. 2, 3, 4 and 5.

The difference is in that the subcarrier allocation table making unit 233 allocates the subcarriers by groups.

Figures 7A, 7B:
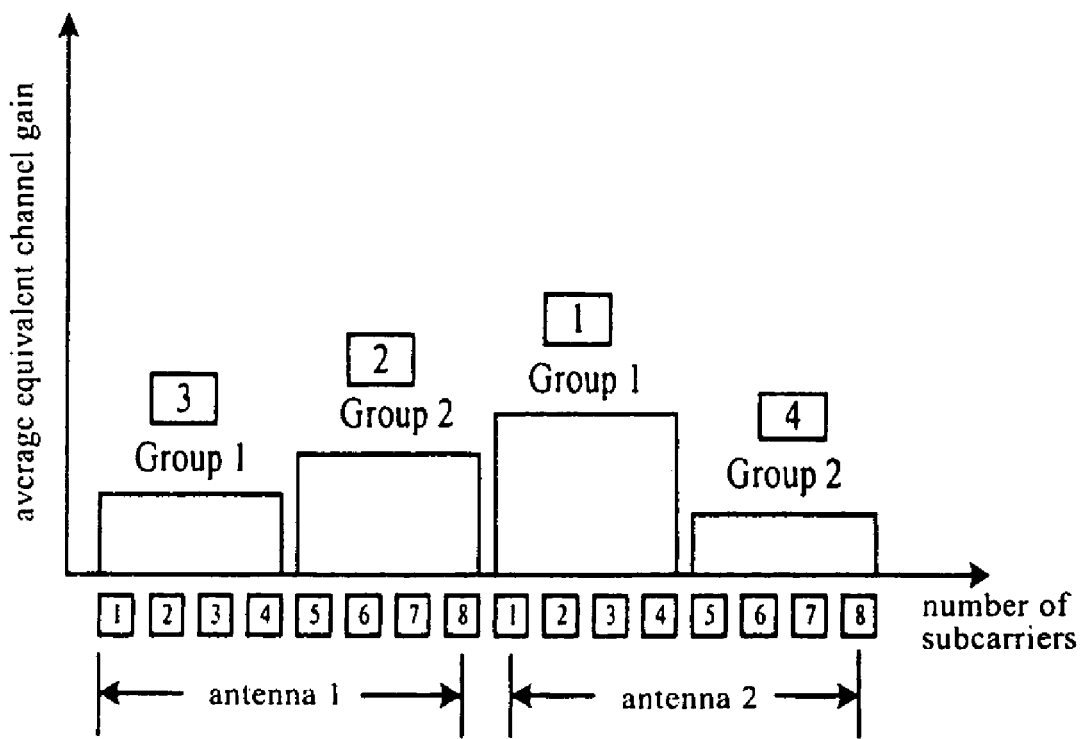
FIG. 7(a) an example of the subcarrier allocation table updated by the subcarrier allocation table making unit in the receiver 2 and fed back to transmitter 1 according to the second embodiment of the present invention.
FIG. 7(b) is a function diagram showing the equivalent channel gain referred by the subcarrier allocation table making unit when making the subcarrier allocation table.

FIG. 7(a) an example of the subcarrier allocation table updated by the subcarrier allocation table making unit in the receiver 2 and fed back to transmitter 1 according to the second embodiment of the present invention. FIG. 7(b) is a function diagram showing the equivalent channel gain referred by the subcarrier allocation table making unit when making the subcarrier allocation table.

Suppose that the system has transmit antenna 1 and 2 and can use 8 subcarriers to transmit data. In the present embodiment, the subcarrier allocation table making unit 233 classifies the 4 neighbouring subcarriers of the transmit antenna as a group.

As shown in FIG. 7(b), the subcarrier allocation table making unit 233 calculates the average equivalent channel gain of each group, the error characteristics of each data stream and allocates the subcarrier with the maximum equivalent channel gain to the data stream with the maximum error.

According to FIG. 7(b), the subcarrier allocation table making unit 233 allocates the subcarrier group 1 of the transmit antenna 2 and the subcarrier group 2 of the transmit antenna 1 with the maximum equivalent channel gains to the data stream A with the maximum error and allocates the subcarrier group 2 of the transmit antenna 2 and the subcarrier group 1 of the transmit antenna 1 with the minimum equivalent channel gains to the data stream B with the minimum error.

According to the group scheme in the second embodiment, the simplified subcarrier allocation table can be obtained. If the subcarriers of each antenna are divided into Ng groups and the number of the transmit antenna is N, then the amount of the feedback information needs to be fed back by the receiver 2 is $Ng*L*\log 2(N)$. Comparing with the amount of feedback information in the embodiment 1, the amount of feedback information in the second embodiment is Ng/L of that in the first embodiment.

However, compared with the effect of the first embodiment, the performance of the second embodiment declines a bit, but the amount of feedback information is reduced greatly.

Modified Embodiment

It is to be noted that in the above embodiments, the prestored subcarrier allocation table in transmitter 1 and the receiver 2 indicates that the same antenna transmits the L subcarriers converted from one data stream. However, the prestored subcarrier allocation table can also be an experienced subcarrier allocation table obtained by the system, which is the subcarrier allocation table corresponding to the best performance achieved during the procedure of data transmission and it may indicate that the L subcarriers converted from one data stream are transmitted by different antennas.

In addition, if every data stream is correctly received during a data transmission (initial transmission or retransmission) procedure, the transmitter 1 can continue to use the subcarrier allocation table used in the data transmission for new data and can also use the prestored subcarrier allocation table for new data.

And the procedure of calculating subcarrier equivalent channel gain by the acquiring and computing unit 232 can be realized at the front side of the receiver 2. The acquiring and computing unit 232 and the subcarrier allocation table making unit 233 can be integrated into one module.

Then, the comparisons on BLER, throughput and average transmission times performance between the space-time-frequency diversity HARQ method adopted in the present invention and other five schemes will be explained with reference to FIG. 8 to FIG. 13.

The five schemes are: Scheme I is the simple combination of chase combining and MIMO-OFDM system. Scheme II is the partial frequency method proposed in Hiroyuki Atarashi, et al., "Partial Frequency ARQ System for Multi-Carrier Packet Communication," IEICE TRANS. COMMUN., VOL. E78-B, No. 8 August 1995 and Liyu Cai, et al., "Improved HARQ Scheme Using Channel Quality Feedback for OFDM System," Vehicular Technology Conference, 2004. VTC 2004-Spring. 2004 IEEE 59th Volume 4, 17-19 May 2004 Page(s): 1869-1872 Vol. 4. Scheme III is to apply the maximal combining ratio frequency diversity scheme proposed in Hiroyuki Atarashi, et al., "An Efficient ARQ Scheme for Multi-Carrier Modulation Systems Based on Packet Combining," IEICE TRANS. COMMUN., VOL. E82-B, NO. 5 May 1999 and T. Kumagai, et al., "A Maximal Ratio Combining Frequency Diversity ARQ Scheme for High-Speed OFDM Systems," Personal, Indoor and Mobile Radio Communications, 1998, The Ninth IEEE International Symposium on Volume 2, 8-11 Sep. 1998 Page(s): 528-532 vol. 2 to the MIMO-OFDM system. Scheme IV is to apply the antenna permutation scheme proposed in E. N. Onggosanusi, et al., "HARQ Transmission and Combining for MIMO Systems," Communications, 2003. ICC '03 IEEE International Conference on Volume 5, 11-15 May 2003 Page(s): 3205-3209 vol. to the MIMO-OFDM system. Scheme V is the random scheme, which allocates data streams at the transmitter randomly. The definition of BLER is: 1-correctly received blocks/total transmitted blocks. The definition of throughput efficiency is: the transmission bit number in the unit bandwidth and unit time. The definition of average transmission times is: the average transmission times required whatever the data block is received correctly or not in the case of allowing retransmitting 3 times at most.

Table 2 shows the simulation parameters when comparing system performance. Table 3 shows the 18-path Rayleigh fading channel model for simulating.

TABLE 2

Simulation Parameters

| Modulation | QPSK-OFDM |
|---|---|
| FFT value | 128 |
| Subcarrier number | Nc = 128 |
| FEC | Null |
| Bandwidth | 100 MHz |
| Normalized Doppler frequency | 0.00128, 0.128 |
| Maximum allowing retransmission | M = 3 |
| Channel model | 18-path Rayleigh fading Channel model |
| Number of transmit antennas | 4 |
| Number of receive antennas | 4 |

TABLE 3

18-path Rayleigh Fading Channel Model Parameters

| Path No. | Delay (ns) | Power (dB) |
|---|---|---|
| 1 | 0 | −3.3 |
| 2 | 10 | −3.6 |
| 3 | 20 | −3.9 |
| 4 | 30 | −4.2 |
| 5 | 50 | −0 |
| 6 | 80 | −0.9 |
| 7 | 110 | −1.7 |
| 8 | 140 | −2.6 |
| 9 | 180 | −1.5 |
| 10 | 230 | −3 |
| 11 | 280 | −4.4 |
| 12 | 330 | −5.9 |
| 13 | 400 | −5.3 |
| 14 | 490 | −7.9 |
| 15 | 600 | −9.4 |
| 16 | 730 | −13.9 |
| 17 | 880 | −16.3 |
| 18 | 1050 | −21.2 |

Figure 8:
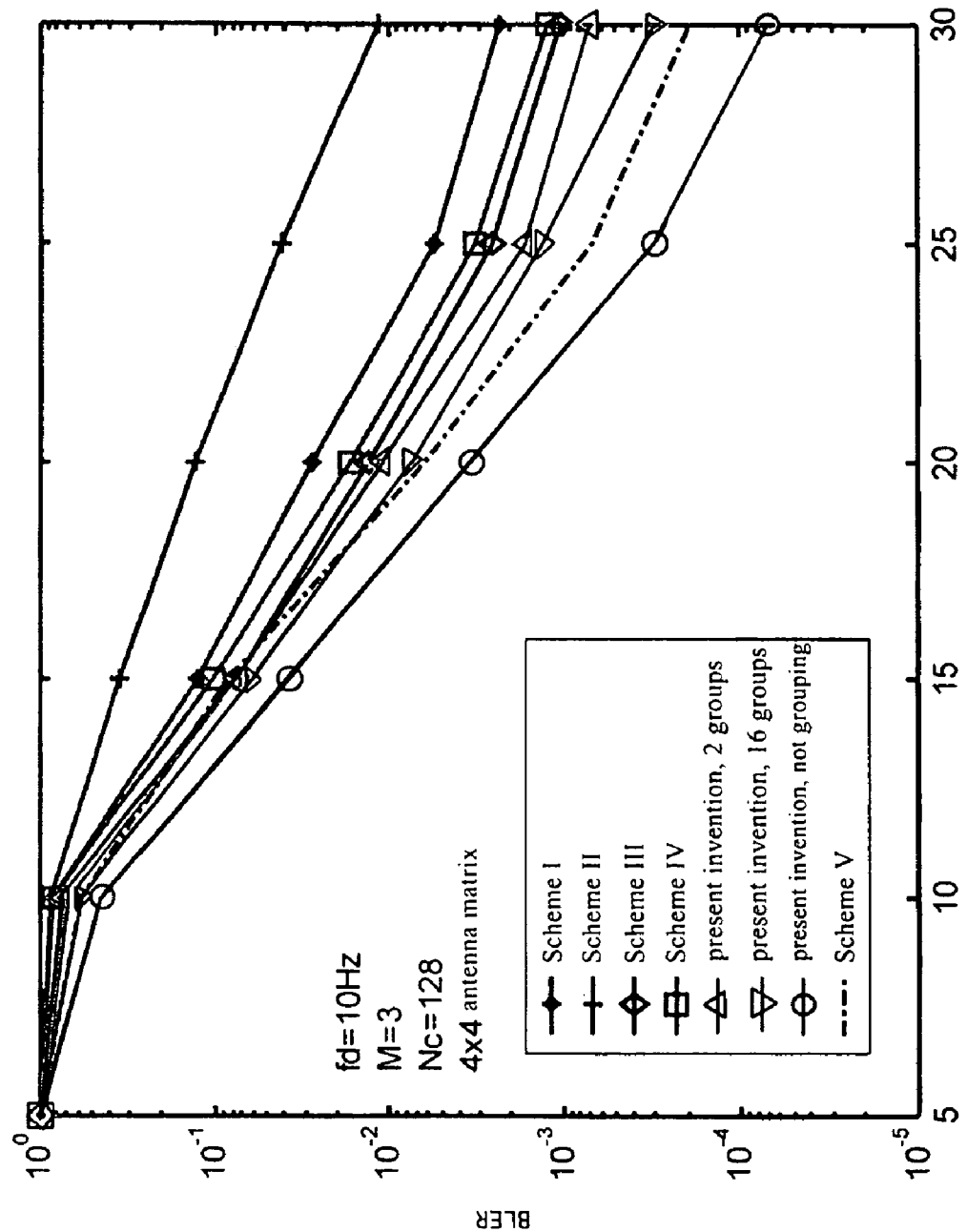
FIG. 8 is the curve diagram showing the relations between BLER and SNR of different HARQ schemes in the slow fading environment.
Figure 9:
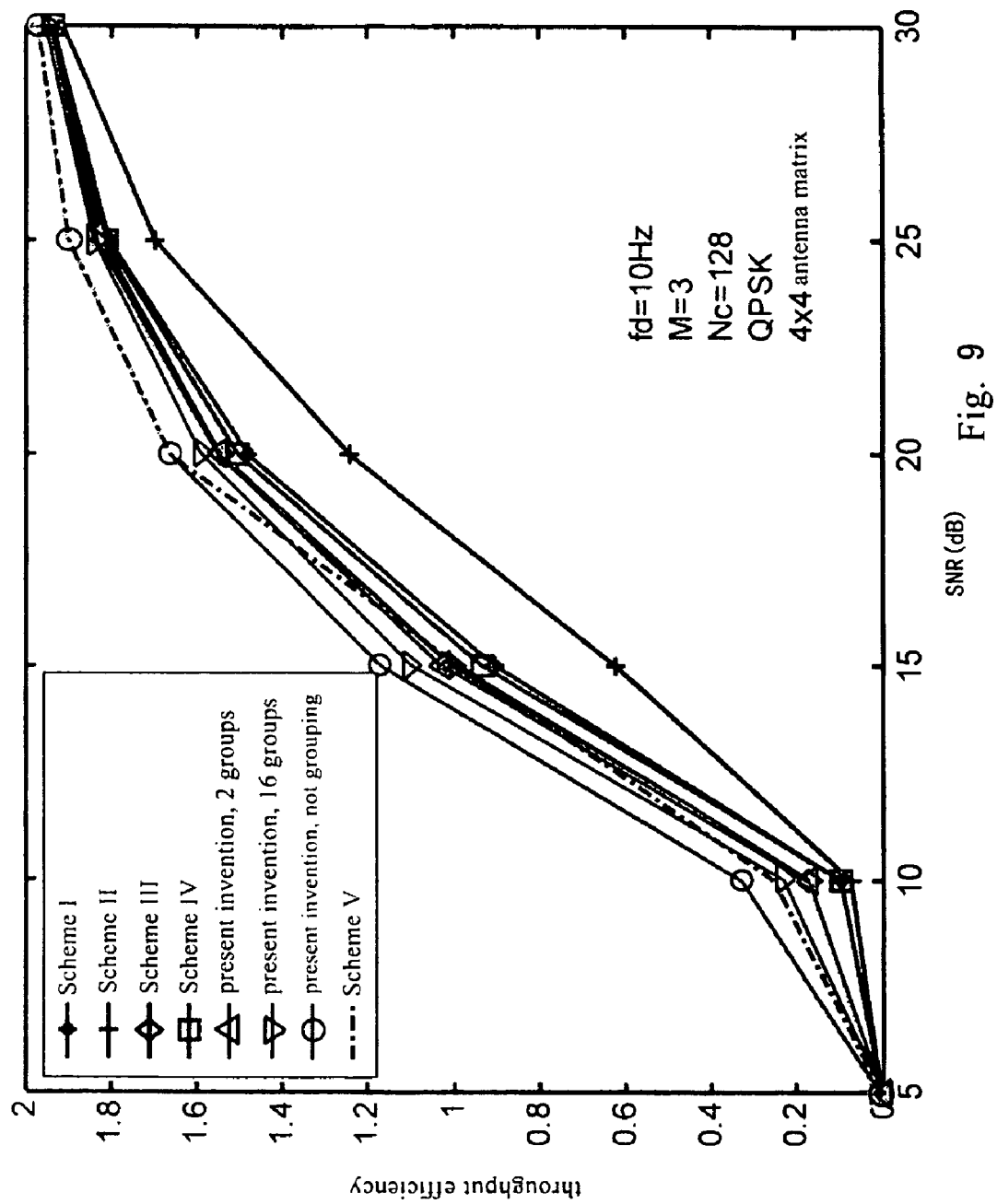
FIG. 9 is the curve diagram showing the relations between the throughput efficiency and SNR of different HARQ schemes in the slow fading environment.
Figure 10:
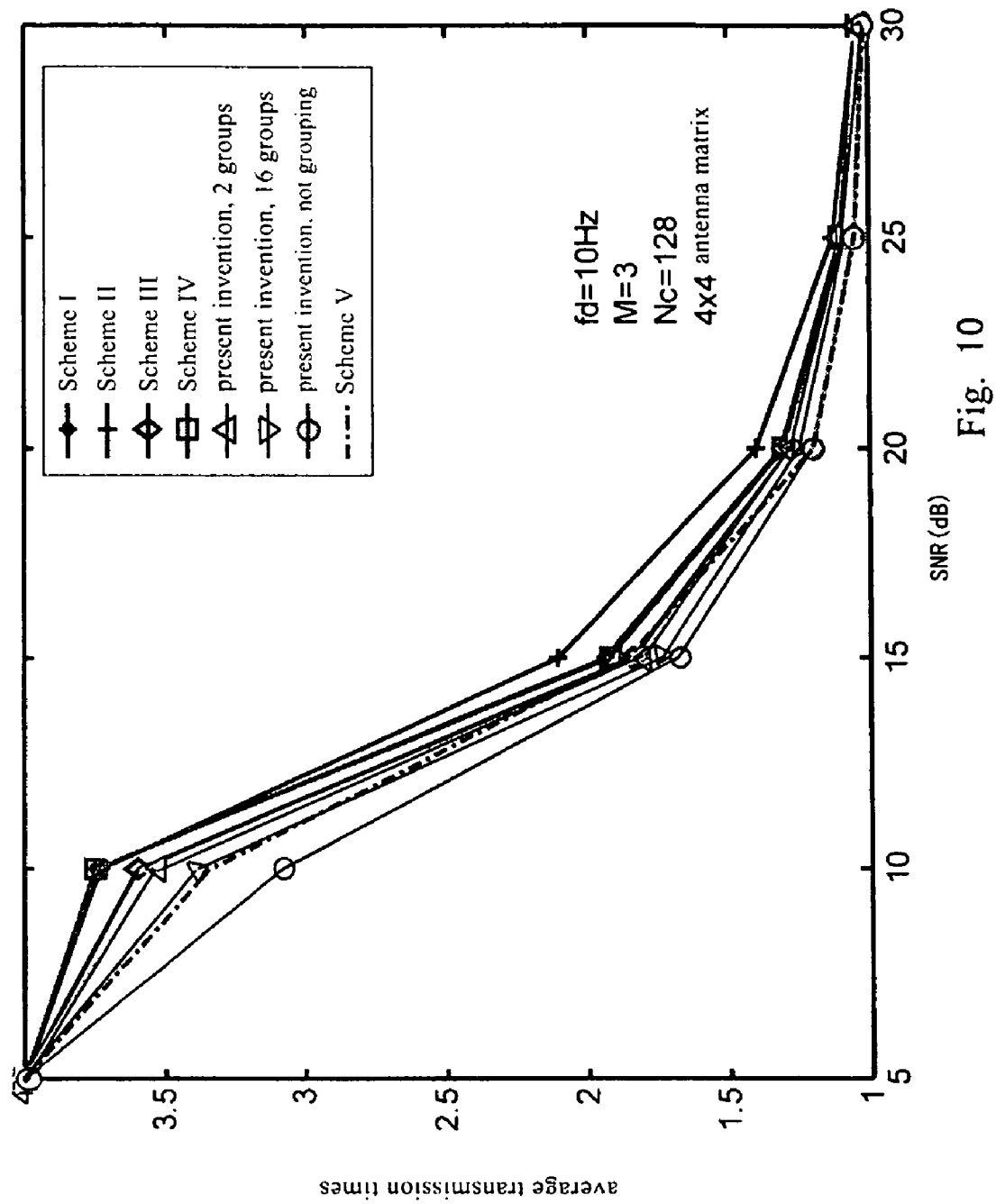
FIG. 10 is the curve diagram showing the relations between the average transmission times and SNR of different HARQ schemes in the slow fading environment.

FIGS. 8, 9 and 10 are the curve diagrams showing the relations between BLER, throughput efficiency, average transmission times and SNR of different HARQ schemes in the show fading environment.

As shown in FIG. 8, with the increase of SNR at the receiver, BLER of all the schemes decreases. The HARQ scheme in the present embodiment obtains the best BLER performance. If the same BLER is obtained, the HARQ scheme in the present embodiment can achieve around 2-9 dB power saving compared with Scheme III. If the scheme of the second embodiment is implemented, e.g., the subcarriers of each antenna are divided into 2 groups or 16 groups, its BLER curve is located between those achieved by the HARQ schemes in Scheme III and the first embodiment. Therefore, in practice, the scheme in the second embodiment of the present invention can be used to compromise the feedback information amount and BLER performance.

FIG. 9 and FIG. 10 show better throughput efficiency and the least average transmission times achieved by the HARQ scheme of the first embodiment compared with other schemes.

Figure 11:
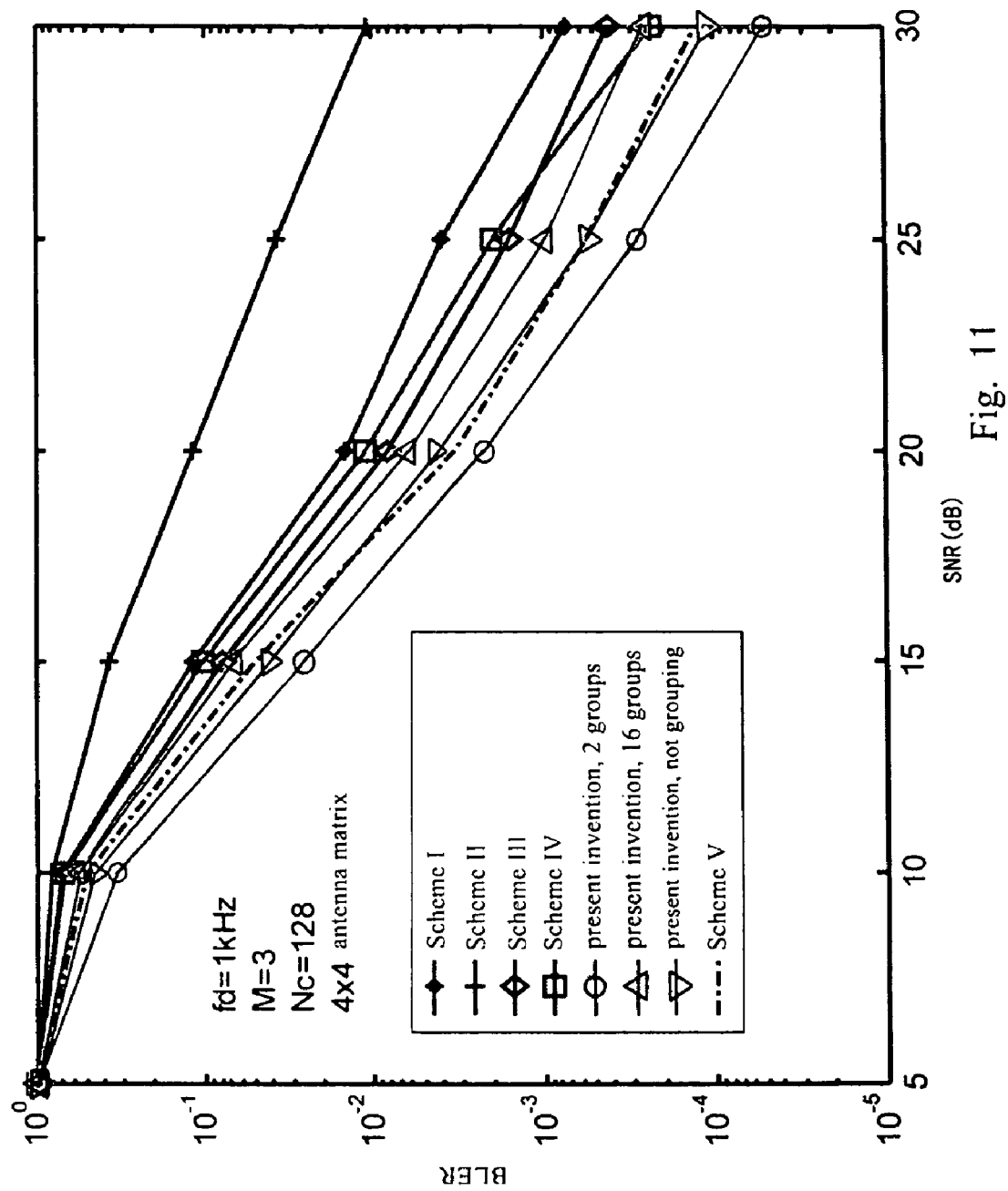
FIG. 11 is the curve diagram showing the relations between BLER and SNR of different HARQ schemes in the fast fading environment.
Figure 12:
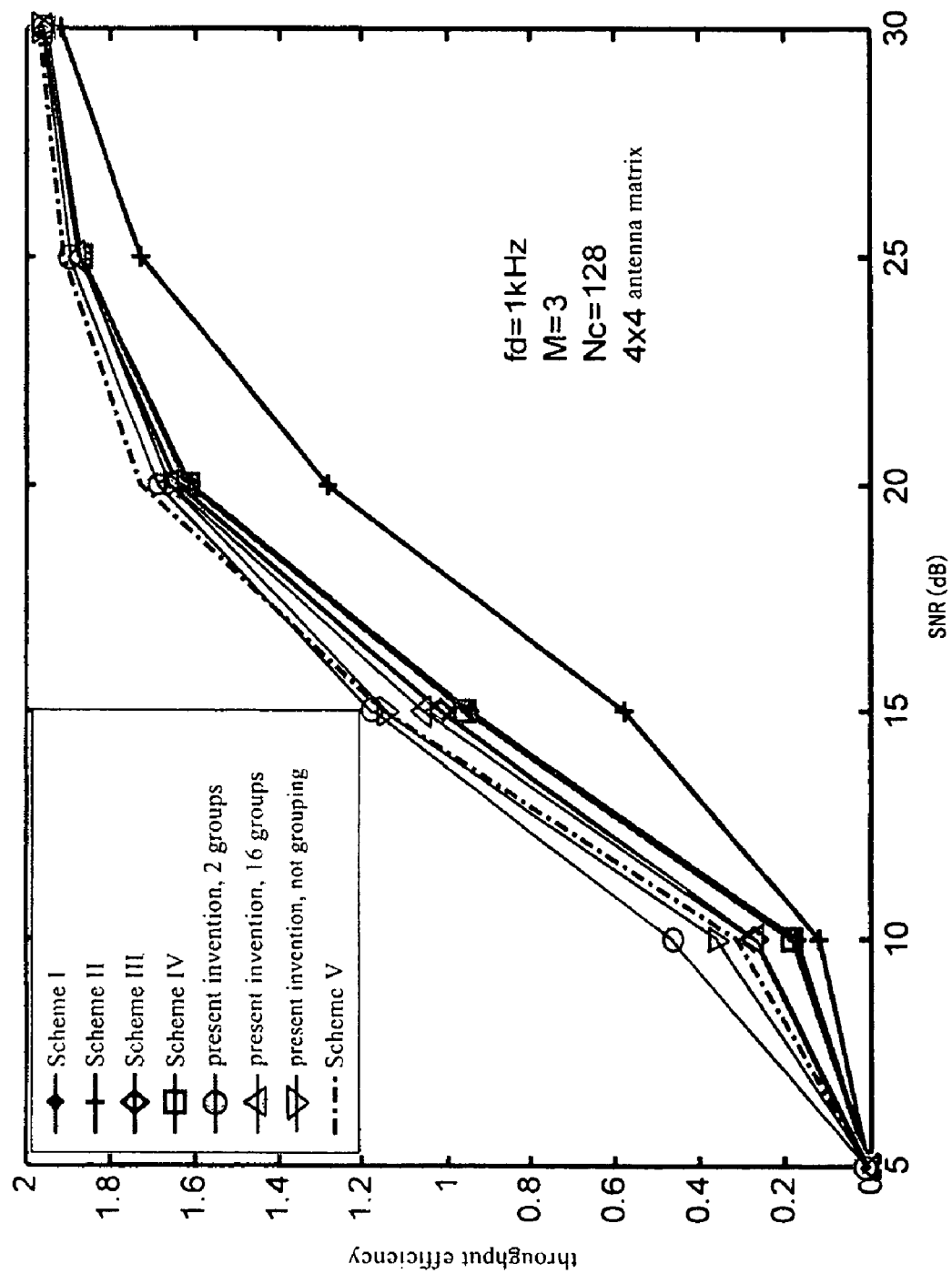
FIG. 12 is the curve diagram showing the relations between the throughput efficiency and SNR of different HARQ schemes in the fast fading environment.
Figure 13:
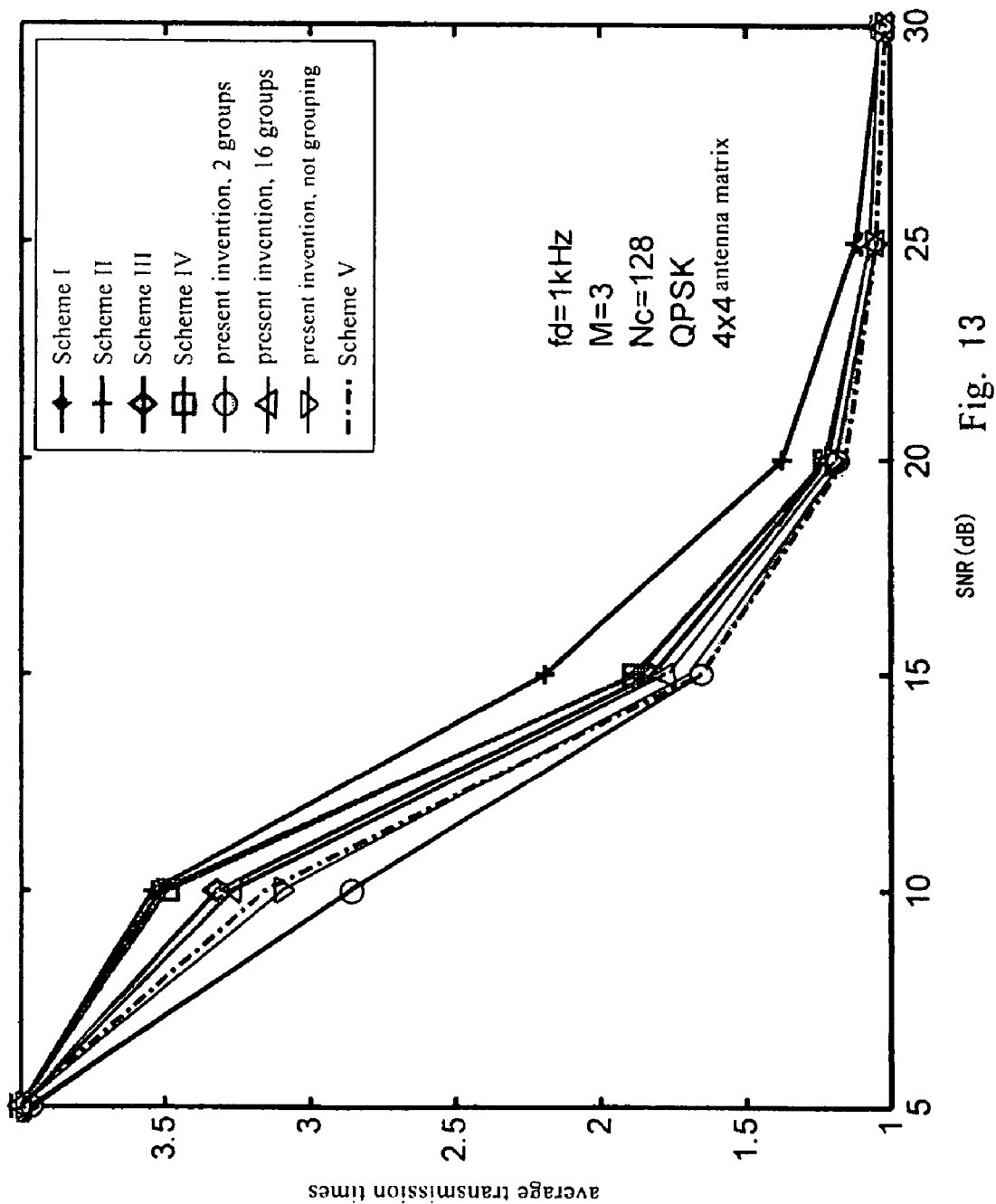
FIG. 13 is the curve diagram showing the relations between the average transmission times and SNR of different HARQ schemes in the fast fading environment.

FIG. 11, FIG. 12 and FIG. 13 are the curve diagrams showing the relations between BLER, throughput efficiency, average transmission times and SNR of different HARQ schemes in the fast fading environment. Similar with that in the slow fading environment, the HARQ scheme of the first embodiment in the present invention obtains the best BLER, throughput efficiency and the least average transmission times performance compared with other schemes.

From the above simulation analysis, the space-time-frequency diversity ARQ method provided by the present invention can obtain better BLER, throughput efficiency and average transmission times performance. And the scheme dividing subcarriers into groups in the second embodiment of the present invention can further reduce the feedback information amount compared with other schemes.

In general, the space-time-frequency resources can be used adequately and the best block error ratio (BLER), throughput and average transmission times performance can be obtained, because the present application allocates different subcarriers to different data streams, and in the procedure of retransmission the present application allocates the subcarriers with the highest equivalent channel gains to the data stream with the largest error size and allocates the subcarrier with the lowest equivalent channel gains to the data stream with the smallest error size or allocates the subcarrier groups with the highest average equivalent channel gains to the data stream with the largest error size and allocates the subcarrier groups with the smallest average equivalent channel gains to the data stream with the smallest error size. Therefore, a more reliable and effective transmission quality can be provided for wireless high-speed data communications.

Figure 14:
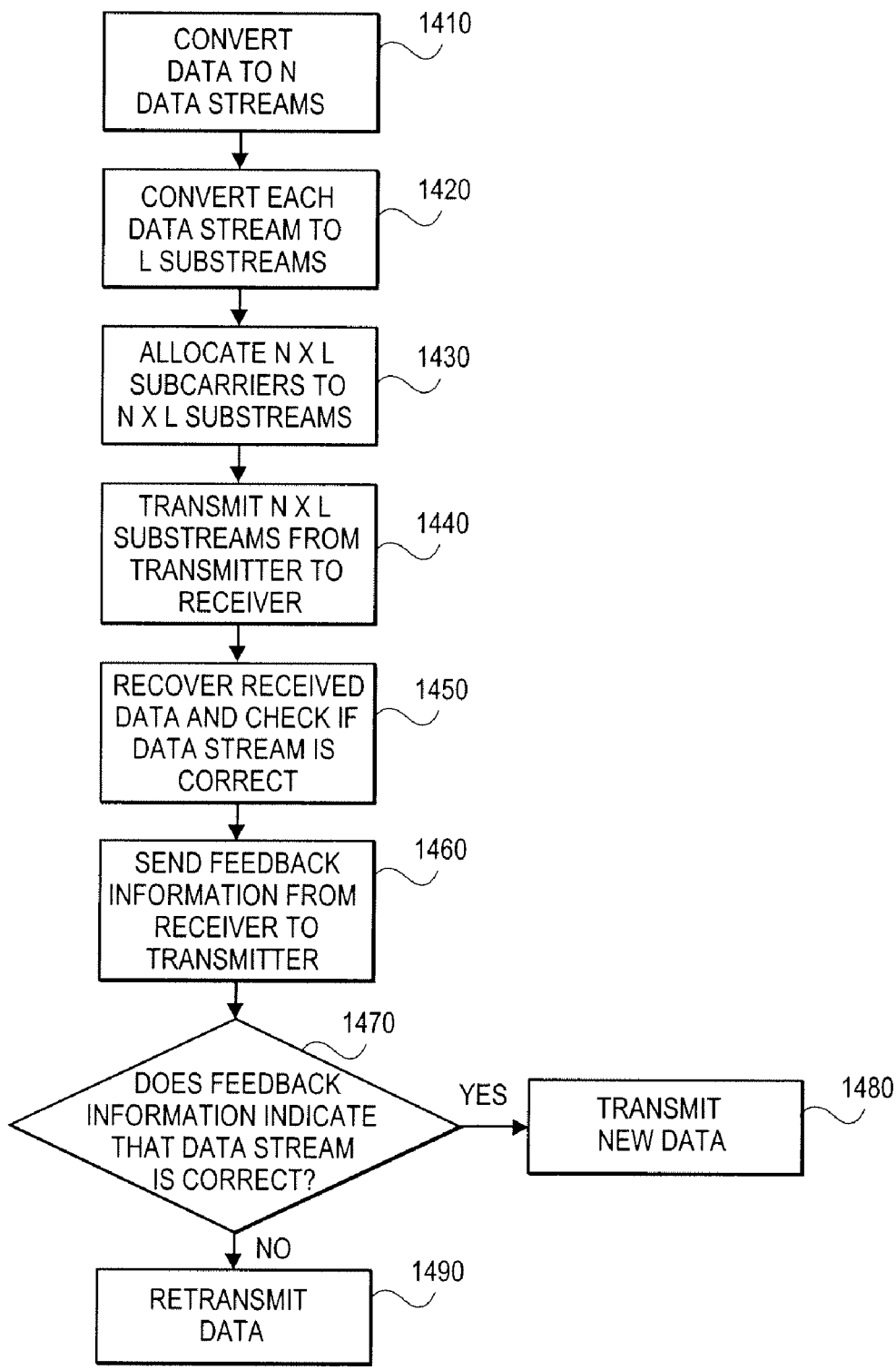
FIG. 14 is a flow diagram illustrating data transmission and receipt of a transmitter and receiver system.

FIG. 14 is a flow diagram illustrating data transmission and receipt of a transmitter and receiver system. A HARQ (Hybrid ARQ) method in which the different transmission data is transmitted with N transmit antennas of a transmitter and received with M receive antennas of a receiver, wherein, each transmit antenna transmits the data by using L subcarriers, and wherein the M and N are natural numbers and L is a multiple of 2.

At operation 1410, the transmitter converts the transmission data into N data streams. At operation 1420, the transmitter converts each data stream into L substreams. The transmitter allocates N×L subcarriers to the N×L substreams according to a subcarrier allocation table prestored in the transmitter and the receiver (operation 1430) and transmits the N×L substreams by the N transmit antennas to the receiver (operation 1440).

At operation 1450, the receiver recovers the received data to the original N data streams according to the subcarrier allocation table prestored in the receiver and checks if each data stream is received correctly. At operation 1460, the receiver sends feedback information to the transmitter. The feedback information includes acknowledgements (ACKs) corresponding to correctly received data streams or negative acknowledgements (NACKs) corresponding to incorrectly received data streams and an updated subcarrier allocation table, wherein, based on equivalent channel gains of the N×L subcarriers and error characteristics of the N data streams, the updated subcarrier allocation table is obtained according to a principle of the subcarrier allocation in which a subcarrier with a highest equivalent channel gain is allocated to a data stream with a largest error size and a subcarrier with lowest equivalent channel gain is allocated to a data stream with a smallest error size or by a principle of subcarrier group allocation in which the best a groups group with a highest average equivalent channel gain is allocated to the data stream with the largest error size and the least a groups group with a lowest average equivalent channel gain is allocated to the data stream with the smallest error size.

At operation 1470, the transmitter determines whether the feedback information received from the receiver indicates that the data stream was received correctly or not. If the feedback information indicates that the data stream was received correctly, then the transmitter transmits new data (operation 1480). If the feedback information indicates that the data stream was not received correctly, then the transmitter retransmits the data (operation 1490).

What is claimed is:

1. A HARQ (Hybrid ARQ) method in which data is transmitted/received with N transmit antennas of a transmitter and M receive antennas of a receiver, wherein, each transmit antenna transmits the data by using L subcarriers, wherein the M and N are natural numbers and L is a multiple of 2, the method including:
   a) converting the data into N data streams, then converting each data stream into L substreams, allocating N×L subcarriers to the N×L substreams according to a subcarrier allocation table prestored in the transmitter and the receiver, and transmitting the N×L substreams by the N transmit antennas;
   b) recovering the received data to the original N data streams according to the subcarrier allocation table prestored in the receiver, checking if each data stream is received correctly and sending feedback information to the transmitter, wherein
   the feedback information includes acknowledgements (ACKs) corresponding to correctly received data streams or negative acknowledgements (NACKs) corresponding to incorrectly received data streams and an updated subcarrier allocation table, wherein, based on equivalent channel gains of the N×L subcarriers and error characteristics of the N data streams, the updated subcarrier allocation table is obtained according to a principle of the subcarrier allocation in which a subcarrier with a highest equivalent channel gain is allocated to a data stream with a largest error size and a subcarrier with lowest equivalent channel gain is allocated to a data stream with a smallest error size or by a principle of subcarrier group allocation in which a group with a highest average equivalent channel gain is allocated to the data stream with the largest error size and a group with a lowest average equivalent channel gain is allocated to the data stream with the smallest error size; and
   c) the transmitter transmits new data or retransmits the data according to the feedback information.

2. A HARQ method as defined in claim 1, wherein
in c), retransmitting the incorrectly received data stream according to the updated subcarrier allocation table indicated by the feedback information; and
transmitting new data according to the updated subcarrier allocation table indicated by the feedback information when all the N data streams are received correctly.

3. A HARQ method as defined in claim 1, wherein
in c), re-transmitting the incorrectly received data streams according to the updated subcarrier allocation table in the feedback information; and
transmitting new data according to the subcarrier allocation table used in a former data transmission procedure in which all the N data streams are received correctly, the former data transmission procedure is an initial transmission procedure or a retransmission procedure.

4. A HARQ method as defined in claim 2 or 3, wherein
the subcarrier allocation table prestored in the transmitter and the receiver indicates that the L substreams converted from a same data stream are transmitted by the L subcarriers of a same transmit antenna or different transmit antennas.

5. A HARQ method as defined in claim 4, wherein
among the L subcarriers of the same transmit antenna, the same number of neighbored/distributed subcarriers are classified into the subcarrier groups respectively.

6. A HARQ method as defined in claim 5, wherein
only re-transmitting the incorrectly received data streams or re-transmitting all the N data streams during the retransmission.

7. A HARQ method as defined in claim 6, wherein
the subcarrier allocation table adopted by the transmitter to retransmit data and the receiver to recover data is the same in each retransmission.

8. A HARQ (Hybrid ARQ) system in which data is transmitted/received with N transmit antennas and M receive antennas, wherein, each transmit antenna transmits the data by using L subcarriers, the M and N are natural numbers and L is a multiple of 2, characterized in that:
   a transmitter having the N transmit antennas converts the data into N data streams, then converts each data stream into L substreams, allocates N×L subcarriers to the N×L substreams according to a subcarrier allocation table prestored in the transmitter and a receiver and transmits the N data streams by the N transmit antennas,
   and the transmitter transmits new data or retransmits the data according to feedback information sent by the receiver; and
   the receiver recovers the received data to the N data streams according to the prestored subcarrier allocation table, checks if each data stream is received correctly and feeds back the feedback information to the transmitter, wherein,
   the feedback information includes acknowledgements (ACKs) corresponding to correctly received data streams or negative acknowledgements (NACKs) corresponding to incorrectly received data streams and an updated subcarrier allocation table, wherein, based on equivalent channel gains of the N×L subcarriers and error characteristics of the N data streams, the updated subcarrier allocation table is obtained according to a principle of subcarrier allocation in which a subcarrier with a highest equivalent channel gain is allocated to a data stream with a largest error size and a subcarrier with lowest equivalent channel gain is allocated to a data stream with a smallest error size or by a principle of subcarrier group allocation in which a group with a highest average equivalent channel gain is allocated to the data stream with the largest error size and a group with a lowest average equivalent channel gain is allocated to the data stream with the smallest error size.

9. A HARQ system as defined in claim 8, wherein the transmitter includes:
a serial-to-parallel conversion section to convert the transmit data into N parallel data streams;
N parallel data stream sections to perform cyclic redundancy check (CRC), encoding and modulation respectively for the N parallel data streams and form N parallel data streams respectively;
a subcarrier allocation section to convert each of the N parallel data streams into the L substreams and thus obtain the N×L substreams; and allocate the N×L subcarriers to the N×L substreams according to the subcarrier allocation table; and
N parallel transmission sections to perform inverse fast fourier transform (IFFT) and cyclic prefix (CP) adding for the N×L substreams and then transmit the N×L substreams by the N transmit antennas respectively.

10. A HARQ system as defined in claim 9, wherein
the subcarrier allocation section includes N serial-to-parallel conversion units and an allocation unit,
the serial-to-parallel conversion unit is operable to convert each of the N parallel data streams into the L substreams, and
the allocation unit is operable to allocate the N×L subcarriers to the N×L substreams according to the subcarrier allocation table.

11. A HARQ system as defined in claim 10, wherein
the subcarrier allocation section transfers the L substreams which are converted from a same data stream to one transmission section or different transmission sections according to the subcarrier allocation table.

12. A HARQ system as defined in claim 11, wherein
the transmitter re-transmits the incorrectly received data stream according to the updated subcarrier allocation table indicated in the feedback information; and transmits new data according to the updated subcarrier allocation table indicated in the feedback information when all the N data streams are received correctly.

13. A HARQ system as defined in claim 11, wherein
the transmitter retransmits the incorrectly received data streams according to the updated subcarrier allocation table indicated by the feedback information; and transmits new data according to the subcarrier allocation table in a former data transmission when all the N data streams are received correctly, the former data transmission is an initial transmission or a retransmission.

14. A HARQ system as defined in claim 12 or 13, wherein
the receiver includes M parallel receive sections, a signal separation section, an allocation table making section, N parallel data recovering sections and a parallel-to-serial conversion section,
M parallel receiving sections remove the CP of the data from the N transmit antennas and perform fast fourier transform (FFT) to form frequency-domain signals;
the signal separation section separates the output from the M parallel receive sections and obtains the N×L substreams according to V-BLAST algorithm;
the allocation table making section recovers the N data streams from the N×L substreams according to the subcarrier allocation table, and obtains the updated subcarrier allocation table according to the output of the data recovering section, wherein the subcarrier allocation table adopted by the transmitter to transmit the N data streams and by the receiver to recover the N data streams is the same during the process of initial data transmission/current data retransmission;
the allocation table making section obtains the updated subcarrier allocation table based on the equivalent channel gains and the error characteristics of the N data streams, according to the principle of the subcarrier allocation in which the subcarrier with the highest equivalent channel gain is allocated to the data stream with the largest error size and the subcarrier with the lowest equivalent channel gain is allocated to the data stream with the smallest error size or by the principle of the subcarrier group allocation in which the group with the highest average equivalent channel gain is allocated to the data stream with the largest error size and the group with the lowest average equivalent channel gain is allocated to data stream with the smallest error size;
the N parallel data recovering sections perform demodulation, combination, decoding and CRC for the N data streams outputted from the allocation table making section and obtain the decoding results and the CRC results of the N data streams, wherein the decoding results include the error characteristics of the data streams and the CRC results correspond to ACK/NACK; and
the parallel-to-serial conversion section performs parallel-to-serial conversion for the decoding results of the N data streams from the N parallel data recovering sections and obtains the data transmitted by the transmitter,
wherein the receiver feeds back the updated subcarrier allocation table and ACK/NACK corresponding to the CRC results of the N data streams to the transmitter as the feedback information.

15. A HARQ system as defined in claim 14, wherein the allocation table making section includes a data stream recovering unit, a detection and computation unit and a subcarrier allocation table making unit,
the data stream recovering unit recovers the N data streams from the N×L substreams according to the subcarrier allocation table in the subcarrier allocation table making unit;
the detection and computation unit records the error characteristics of the N data streams according to the decoding results of the data streams outputted from the data recovering unit, and compute the equivalent channel gain of the N×L subcarriers according to the channel matrix between the transmit antenna and the receive antenna;
the subcarrier allocation table making unit obtains the updated subcarrier allocation table according to the principle of the subcarrier allocation in which the subcarrier with the highest equivalent channel gain is allocated to the data stream with the largest error size and the subcarrier with the lowest equivalent channel gain is allocated to the data stream with the smallest error size or by the principle of the subcarrier group allocation in which the group with the highest average equivalent channel gain is allocated to the data stream with the largest error size and the group with the lowest average equivalent channel gain is allocated to the data stream with the smallest error size.

16. A HARQ system as defined in claim 15, wherein
each of the N parallel data recovering sections includes a demodulation unit, a maximal ratio combining unit, a memory, a decoding unit and a CRC unit, wherein the N parallel data recovering sections correspond to the N data streams respectively, the demodulation unit demodulates the data streams from the allocation table making section and obtains the demodulated results of the data streams;

the maximal ratio combining unit judges the demodulation results of the data streams from the demodulation section, wherein if it is the data stream initially transmitted, it will be inputted to the memory directly and then inputted to the decoding unit as the combined result; if it is a retransmitted data stream, it will be inputted into the memory and thus a plurality of replicas of the data stream received at different times in the memory will be combined and sent to the decoding unit as the combined result;

the decoding unit decodes the combined result outputted from the maximal ratio combining unit, obtains the decoding result of the data stream and outputs to the CRC unit and the allocation table making section; and the CRC unit performs CRC for the decoding result of the data stream output from the decoding unit, obtains the CRC result of the data stream and outputs the result to the parallel-to-serial conversion section.

17. A HARQ system as defined in claim 16, wherein the allocation table making section divides the L subcarriers of a same transmit antenna into groups with a same number of neighboring/distributed subcarriers.

18. A HARQ system as defined in claim 17, wherein the transmitter retransmits the incorrectly received data streams or retransmits all the N data streams during the retransmission.

* * * * *